United States Patent [19]

Goodwin et al.

[11] 4,171,828
[45] Oct. 23, 1979

[54] TEXTILE TUBE DOLLY

[75] Inventors: Gerald F. Goodwin, Chester; John R. Letchworth, Richmond; Richard A. Botset, Chester, all of Va.

[73] Assignee: Allied Chemical Corporation, Morris Township, N.J.

[21] Appl. No.: 861,221

[22] Filed: Dec. 16, 1977

[51] Int. Cl.$^2$ ............................................. B62D 53/06
[52] U.S. Cl. ............................. 280/638; 280/79.1 R
[58] Field of Search ................. 280/79.1 R, 79.1 A, 280/79.2, 408, 35, 638

[56] References Cited

U.S. PATENT DOCUMENTS

| D. 180,016 | 4/1957 | Frick | 280/79.1 R |
|---|---|---|---|
| 2,789,828 | 4/1957 | Gary | 280/35 |
| 3,558,152 | 1/1971 | Miles | 280/79.1 R |
| 3,608,921 | 9/1971 | Wilson | 280/79.1 R |
| 3,887,219 | 6/1975 | Wilson | 280/408 |
| 3,934,683 | 1/1976 | Walker | 280/79.1 R |
| 4,042,108 | 8/1977 | Brethaur | 206/392 |
| 4,062,448 | 12/1977 | Meighan | 206/432 |
| 4,088,337 | 5/1978 | Larsen | 280/79.1 R |
| 4,092,050 | 5/1978 | Sobeck | 280/106 T |
| 4,098,518 | 7/1978 | Minkoff | 280/47.13 R |
| 4,118,048 | 10/1978 | Spranger | 280/79.1 R |

*Primary Examiner*—Robert R. Song
*Attorney, Agent, or Firm*—Richard A. Anderson

[57] ABSTRACT

A dolly is provided for transporting and storing textile tubes. The dolly comprises a split shallow-walled platform mounted on a plurality of casters. The two halves of the platform are hinged so that they can be pivoted to an open or closed position. One half of the platform is mounted on at least two stationary casters to inhibit lateral movement of the dolly when in the open position.

6 Claims, 2 Drawing Figures

TEXTILE TUBE DOLLY

BACKGRUND OF THE INVENTION

1. FIELD OF THE INVENTION

This invention relates to a dolly for transporting and storing textile tubes and, more particularly, to a dolly for transporting and storing a plastic film wrapped assembly which contains at least two adjacent trays full of similar textile tubes standing on end.

2. DESCRIPTION OF THE PRIOR ART

In the textile industry, tubes are ordinarily utilized as yarn carriers, e.g., as the core on which yarn is wound at an intermediate yarn processing step or as the ultimate sales package on which wound yarn is delivered to customers. These tubes are usually hollow cylinders fabricated of an inexpensive, expendable material such as thermoplastic polymers or paperboard, although other materials are feasible. The particular end use of a tube will determine its dimensions, i.e., diameter and height. Currently, empty tubes are delivered to a plant by the supplier in corrugated boxes. All tubes within a given box are of the same size and stacked on end in layers. After delivery, the box of tubes is taken to a production area of the plant where the tubes are manually transferred to a storage bin in which they lay on their sides. An operator can, when necessary, obtain empty tubes from the bin for use.

Suppliers of the empty tubes are encouraging the switch over to cheaper and more easily disposed of packaging than the aforementioned corrugated box. Two such types of packaging are provided by, respectively, the shrink-wrap and stretch-wrap processes. Both processes involve encasing an article in a plastic film wrap, made of, for example, polyethylene, polyvinylchloride, or ethylvinylacetate. In the shrink-wrap process, the article to be wrapped is placed in a bag of the plastic film, larger than the article itself, and then heat is applied to contract or shrink the bag to fit the article. In the stretch-wrap process, the plastic film is stretched to wrap around the article and adhere to itself by cling characteristics of the film or additives in the film, or by a heat sealer. Either of these types of packaging can replace the corrugated box of current usage. The article to be wrapped is an assembly, which comprises vertical stacks of empty tubes standing on end in layers divided by corrugated trays. The base layer of tubes also stands on a corrugated tray and the top layer is capped with an inverted corrugated tray. The plastic wrap is easily removed from the assembly and disposed of when access to the tubes is desired.

Nonetheless, a major problem remains, namely the double handling of the tubes after delivery. Whether delivered in corrugated boxes or a plastic film wrapped assembly the tubes must be taken to a production area where they are manually transferred into a storage bin; from the storage bin the tubes must once again be manually removed for use by an operator.

To eliminate this double handling, and therefore reduce labor costs, the textile tube dolly comprising the present invention has been developed. It is especially adapted for use in conjunction with plastic film wrapped assemblies of textile tubes, thus incorporating the advantages of such a packaging design.

SUMMARY OF THE INVENTION

The present invention provides a dolly for transporting and storing textile tubes which comprises: a platform with walls, split into two parts and mounted on conveyance means, and connecting means for removably attaching the two parts of the platform. Attachment of the two parts via the connecting means creates a unitary tray in which the textile tubes can be placed for transportation on the conveyance means. The two parts can be disconnected and moved into position on the conveyance means for storing the textile tubes.

As used herein, the term "yarn" is employed in a general sense to indicate textile strand material, including a continuous, often plied strand composed of fibers, filaments, glass, metal, asbestos, paper, or plastic, or a non-continuous strand such as staple, and the like.

The invention will be more clearly understood and additional objects and advantages will become apparent upon reference to the discussion below and to the drawings which are given for illustrative purposes.

DETAILED DESCRIPTION OF THE DRAWINGS

Figure 1:
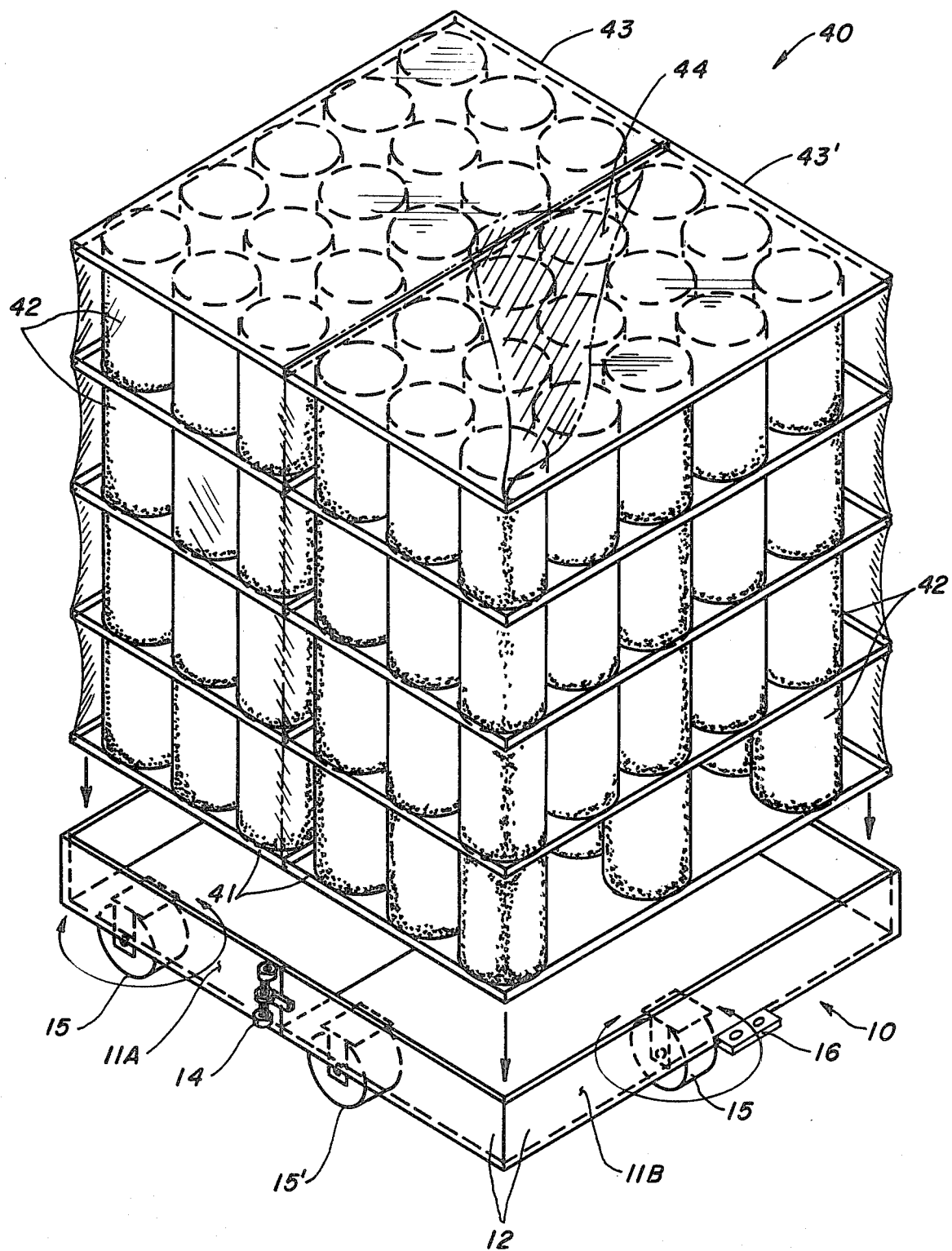
FIG. 1 is an isometric view of the dolly of the present invention in the closed position and of a plastic film wrapped assembly positioned for placement in the dolly as indicated by the arrows.

In the accompanying drawings, like numbers indicate like apparatus. With reference to FIG. 1, the dolly 10 of the present invention is used to transport and store a plastic film wrapped assembly 40 which contains at least two trays 41 of similar textile tubes 42 standing on end. When ony two trays 41 of empty tubes 42 form assembly 40, they are placed adjacent one another. When more than two trays 41 of tubes 42 form assembly 40, they are arranged in at least two vertical stacks 43 and 43'. For shipment purposes, the height dimension of assembly 40 is fixed, and as a consequence, the number of trays 41 in stacks 43 and 43' are limited by the height of tubes 42 standing on end in the trays 41. As indicated previously, the end use of a tube 42 determines its dimensions, and the tubes within a given assembly are of the same size. Thus, the end use of tubes 42 will determine the number of trays 41 in assembly 40. Assembly 40 has a plastic film wrap 44 (see FIG. 1) which can be easily removed for access to tubes 42.

The dolly 10 of the present invention comprises a platform 11 with walls 12, hinge means 13, latch means 14, and a plurality of casters 15 and 15'. With reference to FIG. 1, platform 11 is at least as large as the base of assembly 40 for placement of assembly 40 thereon. Walls 12 of platform 11 must be high enough to retain the plastic film wrapped assembly 40 on platform 11. For ease in transferring assembly 40 to dolly 10, it is preferred that walls 12 be no higher than the height dimension of one of the textile tubes 42, less approximately three inches. A wall 12 of approximately four inches has been found most satisfactory, for ease of transfer. With reference to the drawings, platform 11 is split into two substantially identical parts 11A and 11B which have mating edges and walls. Parts 11A and 11B are each as large as the base of one of the trays 41 in order that a tray or vertical stack of trays 41 may be placed thereon when assembly 40 is transferred to dolly 10.

Figure 2:
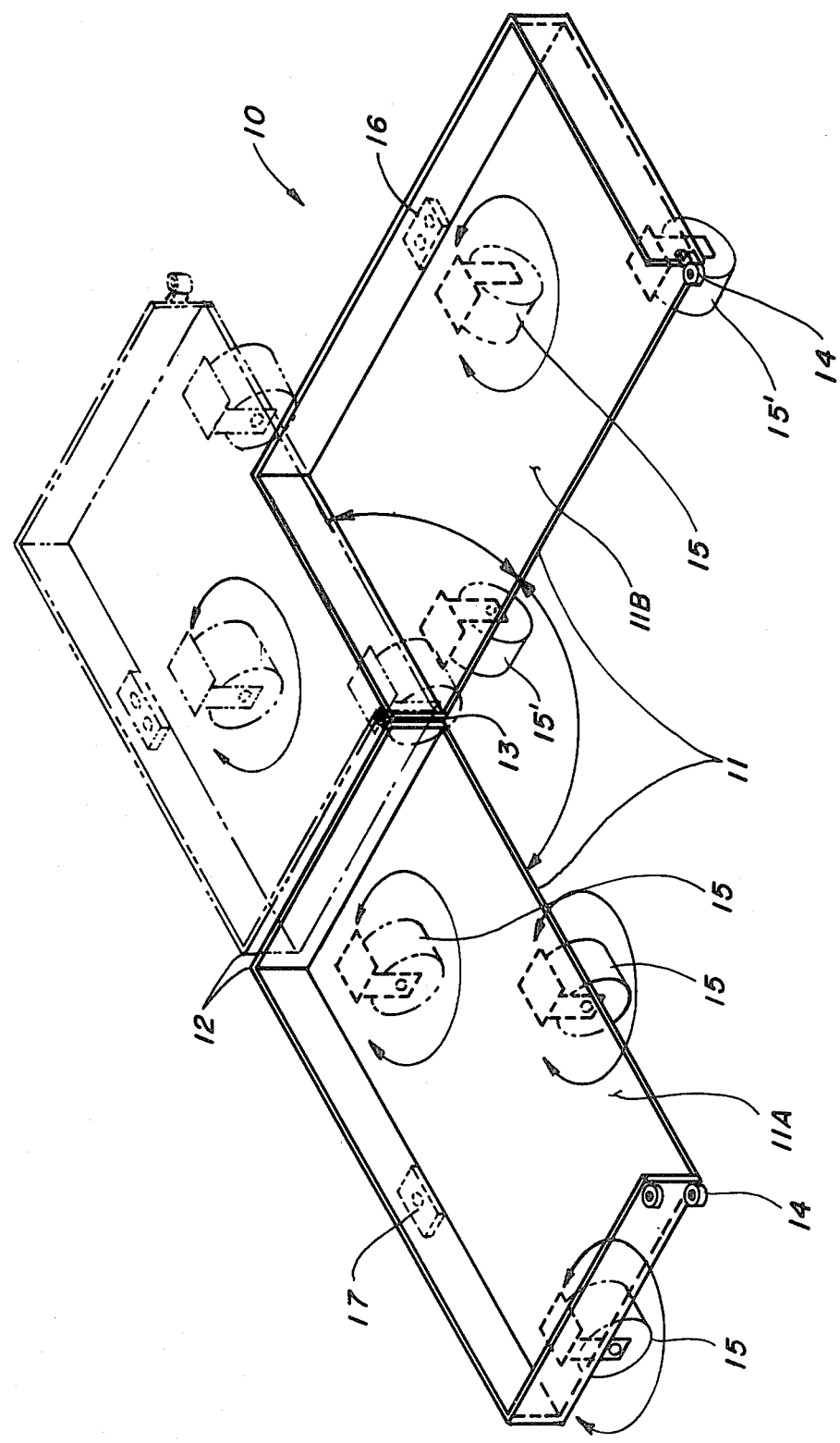
FIG. 2 is an isometric view of the dolly of the present invention in a partially open position, the fully open position being shown in phantom.

As shown in FIG. 2, hinge means 13 connects parts 11A and 11B at walls 12 at one end of the split defining parts 11A and 11B, and may be, for example, a drop pin hinge or a fixed hinge. Parts 11A and 11B can pivot about hinge means 13 to an open or closed position; the closed position is achieved when, as depicted in FIG. 1, the mating edges and walls 12 of parts 11A and 11B are in alignment to form a unitary tray, and the open position is achieved when parts 11A and 11B are pivoted apart until their mating edges are approximately 180° apart to form a straight line (as shown in phantom in FIG. 2).

Latch means 14 removably connects parts 11A and 11B at walls 12 at the other end of the split defining parts 11A and 11B, and holds parts 11A and 11B in the closed position. Latch means 14 can be, for example, a drop pin hinge as depicted in the drawings. If drop pin hinges are utilized as both the hinge means 13 and latch means 14, then the functions of these elements can be interchanged, and parts 11A and 11B can be completely disconnected and used with similar parts 11A and 11B of a similar dolly 10. If such flexibility is desired, it is preferred that there be some way of preventing the coupling of similar parts, i.e., to prevent two part 11 A's from being coupled or two part 11 B's from being coupled. The reason for this preference is explained below. One way of achieving such an exclusion would be to use drop pin hinges as both the hinge means 13 and latch means 14, and restricting the male and female elements of the hinges to, respectively, either part 11A or part 11B on all dollies to be used.

A plurality of casters, swivel 15 is fixed 15', are provided for moving the dolly 10 about. The fixed casters 15' are preferably no more than two in number and are restricted to one part, either 11A or 11B (shown in the drawings as part 11B), of platform 11. All of the other casters 15 swivel freely. There are a minimum of six casters, both fixed 15' and swivel 15, at least three per part, 11A and 11B. The three casters per part are mounted with respect to one another for maximum stability, i.e., in a triangular fashion as shown in FIG. 2. Less than three casters per part would cause instability when dolly 10 is in the open position. The two fixed casters 15' are fixed to move in the direction transverse to the split in platform 11 and preferably are mounted such that a straight line between them approximately parallels the split in platform 11. Any additional fixed casters must be placed approximately in line with and fixed to move in the same direction as these two fixed casters 15'; further, the additional fixed casters are considered additional in the sense of exceeding the minimum number of three casters (15 and 15') per part. The part 11B to which fixed casters 15' are mounted will not readily pivot about hinge means 13 unless caused to slide sideways. Therefore part 11A, with only swivel casters 15 mounted thereto, must be moved in order to achieve the open position. When dolly 10 is in the open position, fixed casters 15' prevent lateral movement of dolly 10. The aforementioned preferance for excluding the coupling of non-similar parts is now more readily understood. As only one part has fixed casters 15', mobility would be seriously hampered by coupling two parts having fixed casters 15'. Further, the coupling of two parts which have only swivel casters 15 would sacrifice the advantage of preventing lateral movement of dolly 10 when in the open position. If desired, a conventional latch may optionally be provided to retain dolly 10 in the open position.

Dolly 10 of the present invention has been described as a solitary unit designed for manual handling; as such, it is not critical which part, 11A or 11B, has fixed casters 15' mounted thereto and either may be chosen at random. However, dolly 10 is readily adapted to be pulled, alone or in tandem with similar dollies, by a vehicle such as a tractor or truck. In this situation, the placement of fixed casters 15' becomes more crucial. The hitch used to pull dolly 10 is preferably a three-point hitch. The single point hitch piece is attached to the pulling vehicle (unshown) while the double point hitch piece 16 is attached to dolly 10 on the end of part 11B which is parallel to the split in platform 11. The trailing part 11A of dolly 10 has a single point hitch piece 17 attached to its end which is parallel to the split in platform 11. Provision of single point hitch piece 17 on part 11A permits the hitching of similar dollies in tandem. Fixed casters 15' should be located within the area of dolly 10 bounded by the lines representing, respectively, one-half to two-thirds of the distance from the pulling vehicle hitch piece to the single point hitch piece 17; this distance is determined by the length of hitch and the size of dolly used. By so restricting the location of fixed casters 15', tracking is ensured.

With reference to the drawings, operation of dolly 10 is as follows. With dolly 10 in the closed position, plastic film wrapped assembly 40 is transferred thereto by conventional means, e.g., with a fork lift or clamp truck. Vertical stacks 43 and 43' of assembly 40 are supported by, respectively, parts 11A and 11B of platform 11, the split between stacks 43 and 43' aligning with the split in platform 11. Walls 12 prevent assembly 40 from sliding off platform 11. Dolly 10 can then be moved to a production area of the textile plant either manually or by means of a tow vehicle hitched to double point hitch piece 16. Part 11B is then placed in its desired position, and the plastic film wrap 44 is removed from assembly 40. Latch means 14 is disconnected, as by removing the pin from a drop pin hinge, and part 11A of platform 11 is moved on casters 15 about hinge means 13 to achieve the open position, i.e., the mating edges of parts 11A and 11B are approximately 180° apart to form a straight line (as shown in phantom in FIG. 2). Vertical stacks 43 and 43' will have moved apart with their respective supporting parts, 11A and 11B. Dolly 10 and assembly 40 are now positioned for storage, lateral movement being inhibited by fixed casters 15'. If desired, dolly 10 can be held in this position by a self-latching mechanism or an anchoring device. An operator can easily obtain empty tubes 42 as needed from the stored dolly 10. When dolly 10 is empty, part 11A is pivoted back to the closed position about hinge means 13, latch means 14 is secured, and dolly 10 is then transferred to an area of the plant for storage or to receive another plastic film wrapped assembly 40.

The number of vertical stacks can be increased so long as the integrity of the split corresponding to that in platform 11 is maintained. For instance, there could be four vertical stacks with two per part 11A or 11B, or six vertical stacks with three per part 11A or 11B. Also, additional casters can be used, preferably of the swivel type. As noted previously, additional fixed casters can be used if placed in line with and fixed to move in the same direction as the two existing fixed casters 15'.

Use of dolly 10 in conjunction with plastic film wrapped assembly 40 thus eliminates the problem of double handling of tubes 42 and results in a reduction of labor costs. This is due to the combined functions served by dolly 10, i.e., transfer and storage of tubes 42.

In this disclosure, there is shown and described only the preferred embodiment of the invention, but it is to be understood that the invention is capable of other and different embodiments, and its several details are capable of various obvious modifications, all without departing from the inventive spirit thereof. It is intended that this invention be limited only as set forth in the following claims.

We claim:

1. A dolly for transporting and storing a plastic film wrapped assembly which contains at least two adjacent trays of similar textile tubes standing on end, said dolly comprising:
   a. a platform with walls, said platform being at least as large as the base of said assembly and being split into two substantially identical parts with mating edges and walls, each of said parts being at least as large as the base of one of said adjacent trays, said walls of said platform being high enough to retain said assembly on said platform when placed thereon but no higher than the height of one of said tubes less approximately three inches;
   b. hinge means, connecting said parts at said walls at one end of the split defining said parts, said parts pivoting about said hinge means towards each other to achieve a closed position wherein said mating edges and walls are aligned to form a unitary tray, said parts pivoting about said hinge means in the other direction to achieve an open position wherein said mating edges are approximately 180° apart to form a straight line;
   c. latch means, removably connecting said parts at said walls at the other end of said split defining said parts and holding said parts in the closed position; and
   d. a plurality of casters, the number of said casters being at least six with at least three of said casters being mounted beneath each of said parts, at least one of the said casters mounted beneath one of said parts being fixed;

whereby said plastic film wrapped assembly is placed in said unitary tray formed when said parts are in the closed position with each of said two adjacent trays being supported by, respectively, one of said parts for transportation, and whereby said textile tubes are stored for use when said parts are in the open position.

2. The dolly of claim 1 wherein the number of said casters is six, three of said casters being mounted beneath each of said parts in triangular relationship with respect to one another.

3. The dolly of claim 1 wherein said hinge means comprises a fixed hinge.

4. The dolly of claim 1 wherein said hinge means comprises a drop pin hinge.

5. The dolly of claim 1 wherein said latch means comprises a drop pin hinge.

6. A dolly for transporting and storing textile tubes comprising:
   a. a platform with walls, split into two parts and mounted on
   b. conveyance means, and
   c. connecting means for removably attaching said two parts and comprising hinge means and latching means, said hinge means connecting said parts at said walls at one end of the split defining said parts, said parts pivoting about said hinge means towards each other to achieve a closed position wherein the mating edges of said parts are aligned to form a unitary tray in which said textile tubes can be placed for transportation on said conveyance means, said parts pivoting about said hinge means in the other direction to achieve an open position for storing said textile tubes wherein said mating edges are approximately 180 degrees apart to form a straight line, said latch means connecting said parts at said walls at the other end of said split defining said parts and holding said parts in the closed position.

* * * * *